(12) United States Patent
Friedrich et al.

(10) Patent No.: US 6,737,134 B2
(45) Date of Patent: *May 18, 2004

(54) ABRASION RESISTANT PIPE

(75) Inventors: Ralph S. Friedrich, Hermosa Beach, CA (US); Colin G. Hull, Palos Verdes Estates, CA (US)

(73) Assignee: Ameron International Corporation, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,591

(22) Filed: May 6, 1998

(65) Prior Publication Data

US 2002/0004116 A1 Jan. 10, 2002

(51) Int. Cl.[7] .................................................. B32B 1/08
(52) U.S. Cl. .......................... 428/36.3; 138/97; 138/98; 138/99; 428/34.5; 428/34.7; 428/36.9; 428/413; 428/425.6
(58) Field of Search .............................. 428/34.5, 413, 428/425.6, 34.7, 36.3, 36.9; 138/97, 98, 99

(56) References Cited

U.S. PATENT DOCUMENTS

| 3,871,409 | A |   | 3/1975  | Gilbu .......................... 138/174  |
| 4,015,044 | A | * | 3/1977  | Raney et al. ................ 428/419  |
| 4,026,747 | A |   | 5/1977  | DeLorean et al. ........... 156/171  |
| 4,042,559 | A |   | 8/1977  | Abelson et al. .............. 260/38   |
| 4,081,302 | A |   | 3/1978  | Drostholm et al. .......... 156/190  |
| 4,368,091 | A |   | 1/1983  | Ontsuga et al. .............. 156/287  |
| 4,521,465 | A |   | 6/1985  | Schröer et al. ............... 428/35  |
| 4,745,170 | A | * | 5/1988  | Bushman et al. ............. 528/61   |
| 5,029,615 | A | * | 7/1991  | Muller et al. ................ 138/98   |
| 5,077,107 | A | * | 12/1991 | Kaneda et al. ............. 428/36.1  |
| 5,184,706 | A |   | 2/1993  | Christenson ................ 193/2 R   |
| 5,266,671 | A | * | 11/1993 | Primeaux .................... 528/68   |
| 5,317,076 | A |   | 5/1994  | Primeaux, II ................ 528/61  |
| 5,618,616 | A |   | 4/1997  | Hume et al. .............. 428/319.3  |
| 5,629,062 | A | * | 5/1997  | Ejiri et al. ................. 428/36.9 |
| 5,662,974 | A | * | 9/1997  | Andrenacci et al. ....... 428/36.9  |
| 5,672,398 | A |   | 9/1997  | Johnson ..................... 428/35.7 |
| 5,814,398 | A | * | 9/1998  | Kronz et al. ................ 428/338  |
| 5,879,501 | A | * | 3/1999  | Livingston .................. 156/242  |
| 5,931,198 | A | * | 8/1999  | Raji et al. ..................... 138/98 |

FOREIGN PATENT DOCUMENTS

CA            2177245        * 11/1996

* cited by examiner

Primary Examiner—Sandra M. Nolan
(74) Attorney, Agent, or Firm—Christie, Parker & Hale, LLP

(57) ABSTRACT

Abrasion resistant pipes of this invention comprise a structural wall formed from a filament wound fiberglass-reinforced material, and an elastomeric abrasion resistant material disposed along the inside and/or outside surface of such pipe. In a preferred embodiment, the structural pipe wall is formed from a filament wound fiberglass-reinforced epoxy resin material, and the abrasion resistant material is formed from a polyurea elastomer. Abrasion resistant pipes of this invention are manufactured using existing filament winding processes by first coating a mandrel with the elastomeric abrasion resistant material, and than winding the resin impregnated filament therearound. Pipes prepared according to principles of this invention have improved properties of toughness, temperature resistance, chemical resistance, and abrasion resistance when compared to conventional fiberglass-reinforced pipes that either have no protective liner or have liners formed from other elastomeric materials.

19 Claims, 2 Drawing Sheets

ABRASION RESISTANT PIPE

FIELD OF THE INVENTION

This invention relates to pipes having a wall surface formed from an abrasion resistant material and, more specifically, to fiberglass-reinforced resin pipes having an internal liner and/or outside surface formed from an elastomeric abrasion resistant material.

BACKGROUND OF THE INVENTION

Pipes, and more specifically fiberglass-reinforced resin pipes, that are used in slurry transport or other abrasive transport service are subjected to a high degree of abrasive wear. The use of fiberglass reinforced resin pipes in such abrasive service, although desired for purposes of corrosion resistance, weight savings and expense, is not practical because such abrasive service causes the inside diameter of such pipes to wear and eventually fail, thereby providing a limited service life.

Efforts have been made to improve the abrasion resistance of fiber-reinforced resin pipes by providing an inside diameter or inner liner made from materials that are relatively more abrasion resistant than the pipe itself. For example, it is known in the art to provide an internal liner for such pipes that is made from rubber to absorb the impact of abrasive particles, thereby reducing damage to the underlying pipe wall. Additionally, U.S. Pat. No. 5,184,706 discloses a fiberglass-reinforced polyurethane pipe that includes an internal liner that is formed from polyurethane to improve the abrasion resistance of the pipe.

A disadvantage of these proposed solutions is that they are not well suited for fiberglass reinforced pipes that use epoxy resin because the rubber and polyurethane material does not form a good bond to the underlying pipe surface. The failure to form a good bond with the pipe prevents the formation of an internal liner useful for abrasion resistant service because the liner itself can be separated from the pipe wall during service, thereby, leaving the underlying pipe wall surface exposed and unprotected. Additionally, the use of rubber and polyurethane materials as an internal liner does not provide a sufficient degree of chemical, temperature, toughness, and abrasion resistance for some abrasive services.

Another technique that has been used to improve the abrasion resistance of such pipes is to improve the hardness of the pipe inside diameter by incorporating ceramic beads or similar hard particles into the resin matrix itself. However, the manufacturing time and raw materials costs associated with implementing this technique, not to mention the weight increase associated with using such beads or particles, makes this technique an unattractive solution.

It is, therefore, desired that fiberglass-reinforced resin pipe be constructed comprising an inside diameter or internal liner formed from an elastomeric material that is abrasion resistant and capable of forming a good chemical bond to the pipe wall. It is desired that the elastomeric abrasion resistant material provide improved properties of toughness and chemical, temperature, and abrasion resistance when compared to polyurethane lined pipes. It is desired that an abrasion resistant pipe comprising such internal liner be relatively easy to manufacture using existing fiberglass-reinforced resin pipe manufacturing techniques, and not add significantly to the weight of the finished abrasion resistant pipe.

SUMMARY OF THE INVENTION

Abrasion resistant pipes of this invention comprise a structural wall formed from a filament wound fiberglass-reinforced material, and an elastomeric abrasion resistant material disposed along the inside and/or outside surface of such pipe. In a preferred embodiment, the structural pipe wall is formed from a filament wound fiberglass-reinforced epoxy resin material, and the abrasion resistant material is formed from a polyurea elastomer. Preferably, the polyurea elastomer is one formed from a 2-component system comprising a first isocyanate-containing component, and a second amine-containing resin component that are combined in a 1:1 volume ratio.

Abrasion resistant pipes of this invention are manufactured using existing filament winding processes by first coating a mandrel with the elastomeric abrasion resistant material, and than winding the resin impregnated filament therearound. A strong chemical bond is formed between the elastomeric abrasion resistant material and the adjacent fiberglass-reinforced resin layer, when the abrasion resistant material is a polyurea elastomer and the fiberglass impregnating resin is an epoxy resin, and the filament winding process is initiated before the underlying polyurea elastomer is allowed to fully cure. The strong bond between the cured abrasion resistant material and the adjacent pipe structural wall surface is desired to ensure that the liner does not separate from the pipe to provide maximum protection against abrasive wear.

Pipes prepared according to principles of this invention have improved properties of toughness, temperature resistance, chemical resistance, and abrasion resistance when compared to conventional fiberglass-reinforced pipes that either have no protective liner or have liners formed from other elastomeric materials.

BRIEF DESCRIPTION OF THE DRAWINGS

These and other features and advantages of the present invention will become appreciated as the same becomes better understood with reference to the specification, claims and drawings wherein:

DETAILED DESCRIPTION

Abrasion resistant pipe embodiments of this invention comprise a supporting pipe structure formed from a filament wound fiberglass-reinforced resin, with an elastomeric abrasion resistant material disposed along the inside pipe diameter and/or outside pipe diameter, depending on the particular pipe application. The abrasion resistant material is preferably formed from a polyurea elastomer that both provides a strong chemical bond with the resin component of the adjacent pipe wall surface, and provides superior properties of toughness, abrasion resistance, temperature resistance, and chemical resistance when compared to pipes lined with other types of elastomer materials.

Figure 1:
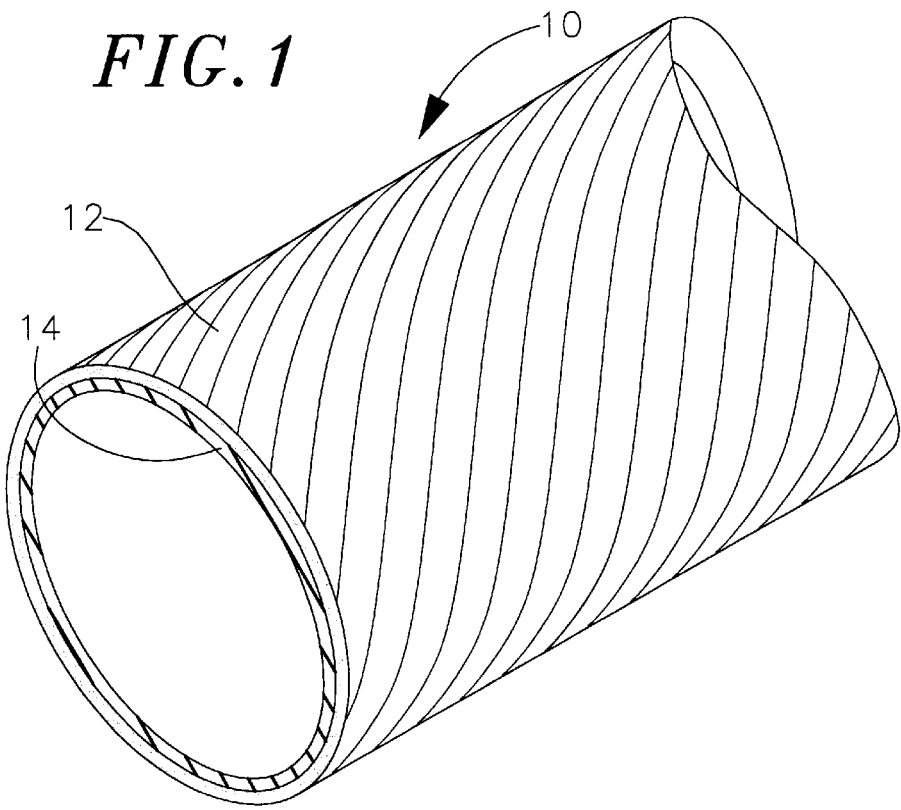
FIG. 1 is a perspective view of an abrasion resistant pipe constructed according to the principles of this invention.

FIG. 1 illustrates a first embodiment abrasion resistant pipe 10 of this invention comprising a pipe structure 12 formed from a filament wound fiberglass-reinforced resin. The pipe can be formed using conventional filament winding methods from conventional filament and resin materials. A suitable resin component can be selected from the group consisting of aromatic, aliphatic, cycloaliphatic or anhydride epoxy resins, polyurethane resins, polyethylene resins, siloxane-modified resins, phenolic resins, polyester resins, vinyl resins, mixtures thereof, or other resin material conventionally used in the manufacture of filament wound fiberglass-reinforced-resin pipes.

In an example embodiment, an epoxy resin is used to form the pipe structure 12. Preferred epoxy resins include those manufactured by, for example: by Shell Chemical Company of Houston, Tex. under the product series EPON and EPONEX; Monsanto of Springfield, Mass. under the product series Santolink LSE-120; Pacific Anchor of Allentown, Pa. under the product series Epodil; Ciba Geigy of Hawthorne, N.Y. under the product series Araldite; Rhone-Poulenc of Louisville, Ky. under the product series Epirez; Reichold of Pensacola, Fla. under the product series Aroflint; Union Carbide of Tarrytown, N.Y. under the product series ERL; CVC of Cherry Hill, N.J. under the product series Epalloy; and Dow Chemical Company of Midland, Mich. under the product series DEN and DER. Particularly preferred epoxy resins are EPON-826 and DER 383.

The first embodiment abrasion resistant pipe 10 includes an abrasion resistant internal liner 14 that is disposed along an inside diameter surface of the pipe structure 12. The liner 14 is formed from an elastomer material capable of providing toughness, and chemical, temperature, and abrasion resistant properties when it is fully cured. It is also important that the elastomer material be capable of adhering or forming a strong chemical bond to the underlying pipe surface. In a preferred embodiment, the abrasion resistant material is a polyurea elastomer having the following basic polymer unit structure:

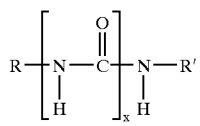

where x is greater than one, where R is selected from the group consisting of aromatic, aliphatic, or cycloaliphatic organic compound having up to about 20 carbon atoms, and where R' is a C=O containing compound comprising up to about 20 carbon atoms. A preferred R' group is a polyether comprising more than one [O=CH$_2$CHCH$_3$] group.

Polyurea elastomers useful for forming abrasion resistant pipes of this invention are preferably prepared by reacting an isocyanate ingredient with an amine ingredient as set out generally below:

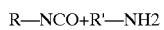

where R and R' are as described above. Preferred isocyanate ingredients include aromatic, aliphatic, or cycloaliphatic isocyanate prepolymers such as those commercially available from Huntsman Corporation of Salt Lake City, Utah. A particularly preferred isocyanate ingredient useful for forming an aromatic polyurea elastomer is an aromatic isocyanate quasi-prepolymer available, for example, from Huntsman. Isocyanate quasi-prepolymers are used to improve the processing characteristics and to allow for uniform polymer preparation. The use of such quasi prepolymers also allows the polyurea elastomer to be prepared from a two-component system, e.g., an isocyanate-containing component and an amine-containing resin component, that can be dispensed at an approximately 1:1 volume ratio.

Such quasi prepolymers can be prepared, for example, from uretonimine modified methylene diisocyanate (MDI) and either polyoxyalkylene diols and/or triols. Example uretonimine modified MDI's that can be used for polyurea elastomer preparation include those manufactured by ICI Polyurethanes of Sterling Heights, Mich. under the RUBINATE product line; Dow Chemicals under the ISONATE product line; Bayer under the MONDUR product line; BASF Corp., of Mount Olive, N.J. under the product name BASF 218; and Air Products and Chemicals of Allentown, Pa. under the AIRTHANE product name.

Alternatively, isocyanate quasi-prepolymers useful for preparing polyurea polymers can be prepared by using pure MDI, or by using polyoxyalkyene polyols, glycerin initiated polyoxypropylene triols, polyester polyols, or PTMEG polyols. Suitable polyoxyalkyene polyols include those commercially available, for example, from PPG Industries, Inc., of Schaumburg, Ill. under the product name PPG-2000 or PPG-4000.

Preferred amine ingredients include primary amine terminated resins such as polyetheramines that are commercially available, for example, from Huntsman under the JEFFAMINE D-and T-series product line.

In a preferred embodiment, the polyurea elastomer is formed using a two-component system that is 100 percent solids and zero volatile organic compounds based on an isocyanate component and an amine-containing resin blend component. Aliphatic or aromatic polyurea elastomer systems can be prepared, depending on the particular isocyanate ingredient selected, to form the abrasion resistant material. Polyurea systems useful in providing abrasion resistant surfaces of this invention are preferably spray applied to the desired substrate surface, and display fast ambient temperature reactivity and cure times.

For aromatic polyurea spray elastomer systems, chain extenders can be used to help control system reactivity. Chain extenders in the form of secondary or hindered primary aromatic diamines have proven useful in adjusting the reactivity, e.g., retarding, of polyurea spray systems. Example chain extenders include those commercially available from Albemarle Corporation of Baton Rouge, La. under the product line ETHACURE, such as ETHACURE 300 (di(methylthio)toluene diamine); UOP Inc., under the product line UNILINK, such as UNILINK 4200 (N,N'-dialkyl methylenedianline), and UNILINK 4100 (N,N'-dialkyl phenylenediamine); and Lonza, Ltd., of Fair Lawn, N.J. under the product name LONZACURE, such as IONZA-CURE M-CDEA (4,4'-methylene-bis-(3-chloro-2,6-diethylaniline).

Polyurea elastomer materials formed from the two-component system, comprising the isocyanate component and the amine-containing resin component, are preferably blended in a volume ratio of approximately 1:1.

In applications where a strong chemical bond between the liner 14 and underlying pipe wall surface is desired, the resin selected for forming the fiberglass-reinforced resin pipe is an epoxy resin. The reason for selecting an epoxy resin is because it promotes the formation of a strong chemical bond, e.g., a covalent bond, with the polyurea elastomer. It is theorized that such chemical bond is formed by a reaction between the amine groups in the uncured polyurea elastomer and the epoxy groups in the uncured epoxy resin pipe component. In applications where a strong chemical bond is not needed, the resin that is selected for making the fiberglass-reinforced resin pipe may be other than an epoxy resin because the polyurea elastomer has good adhesive properties, facilitating its use and adhesion to a number of different resin laminates, and substrates formed from other materials such as steel, plastic, wood, fabric, and the like.

The liner 14 can have a desired thickness to meet particular pipe applications. In an example embodiment, an abrasion resistant pipe for application in abrasive service can have a liner thickness in the range of from about 0.5 to 6 millimeters. Using a liner thickness of greater than about 6 millimeters is not desired because it unnecessarily increases the cost of the finished pipe. Using a liner thickness of less than about 0.5 millimeters will not provide a desired degree of abrasion resistance. For example, for use in forming abrasion resistant pipes having six and eight inch inside diameters, a liner thickness of approximately 1.5 millimeters is desired.

Figure 2:
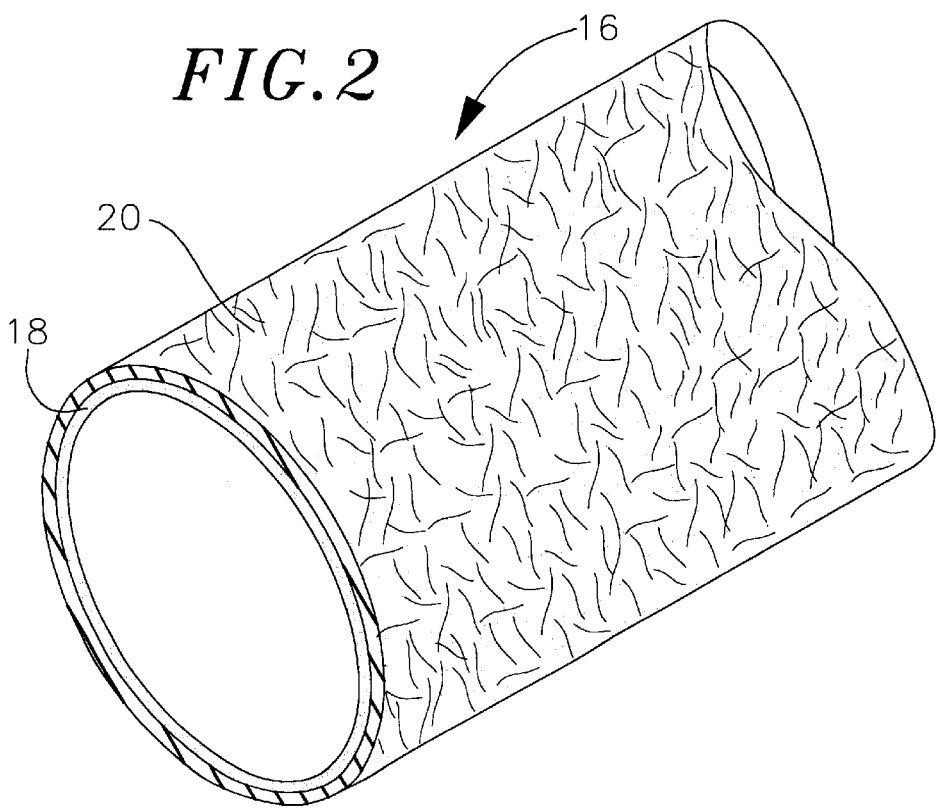
FIG. 2 is a perspective view of a pipe having an abrasion resistant surface prepared according to principles of this invention.

FIG. 2 illustrates an abrasion resistant pipe embodiment 16 comprising a fiberglass-reinforced pipe 18 as described above having an abrasion resistant layer 20 disposed around an outside diameter of the pipe 18. The abrasion resistant layer 20 is formed from the same type of elastomer material discussed above for the first embodiment abrasion resistant pipe. The abrasion resistant layer 20 is provided over an outside surface of the pipe 18 in this embodiment to protect it from the effect of abrasive slurries directed onto it, and to provide impact resistance thereto. For example, the polyurea elastomer material can be sprayed directly over an uncured filament wound fiberglass-reinforced epoxy pipe to provide a chemical bond therewith and seal liquid epoxy therein. Such a construction would avoid the need to rotate the pipe or pipe fitting during cure, and be particularly useful as an impact barrier and for fitting manufacture.

An example application for such pipe embodiment could be fiberglass-reinforced resin spray headers used to desulfur flue gas inside of an exhaust stack of a flue gas desulfurization plant. In such application, the headers are used to spray a limestone slurry, i.e., an abrasive slurry, onto the flue gas to neutralize the gas. In doing so, the slurry is also sprayed onto the outside surface of adjacent headers, thereby creating an abrasive wear condition thereon. Accordingly, in such application, an outer abrasion resistant layer is desired to provide improved toughness, impact resistance, and temperature, chemical and abrasion resistance to the underlying pipe surface, thereby increasing the pipe's useful service life.

Abrasion resistant pipes comprising an inner abrasion resistant liner, such as those disclosed above and illustrated in FIG. 1, are prepared by depositing a coating of the elastomeric abrasion resistant material onto a mandrel used to manufacture the fiberglass-reinforced pipe. Before depositing the coating, however, the mandrel is first coated with a high temperature wax mold release agent. A fiberglass-reinforced resin pipe is made over the elastomer material by conventional filament winding technique. A critical requirement in forming a pipe using epoxy resin, to ensure that the abrasion resistant inner liner is strongly bonded to the adjacent pipe wall surface is that the filament winding step be initiated before the abrasion resistant material is fully cured. The step of applying the filament winding before the underlying abrasion resistant elastomer material is fully cured ensures such material will react with the resin component of the pipe to provide a strong chemical, e.g., covalent, bond therebetween.

The period or window of time during which the filament can be wound before the underlying abrasion resistant elastomer material is fully cured will vary depending on the particular elastomer material that is selected. Polyurea elastomers can have a gel time of as little as three seconds depending on the particular isocyanate component and amine-containing resin component selected. If desired, the gel time of the polyurea elastomer material can be adjusted or retarded to suit particular manufacturing processes or particular pipe application. For example, in a fiberglass-reinforced pipe manufacturing processes using a slow filament winding step, it may be desirable to retard the gel time of the polyurea material to prevent it from fully curing before the filament is wound therearound. As a general rule, it may also be desirable to increase the gel time of the polyurea elastomer as the diameter of the to-be manufactured pipe increases. Generally, for purposes of promoting and maintaining fiberglass-reinforced pipe manufacturing efficiency it is desired that the polyurea elastomer material have a gel time of less than about 60 seconds and, more preferably, of less than about 30 seconds. However, it is to be understood that the polyurea elastomer gel time can be adjusted (in some instances to over 45 minutes) depending on the particular application and manufacturing operation, and still provide the desired chemical bond with the underlying wall structure.

Figure 3:
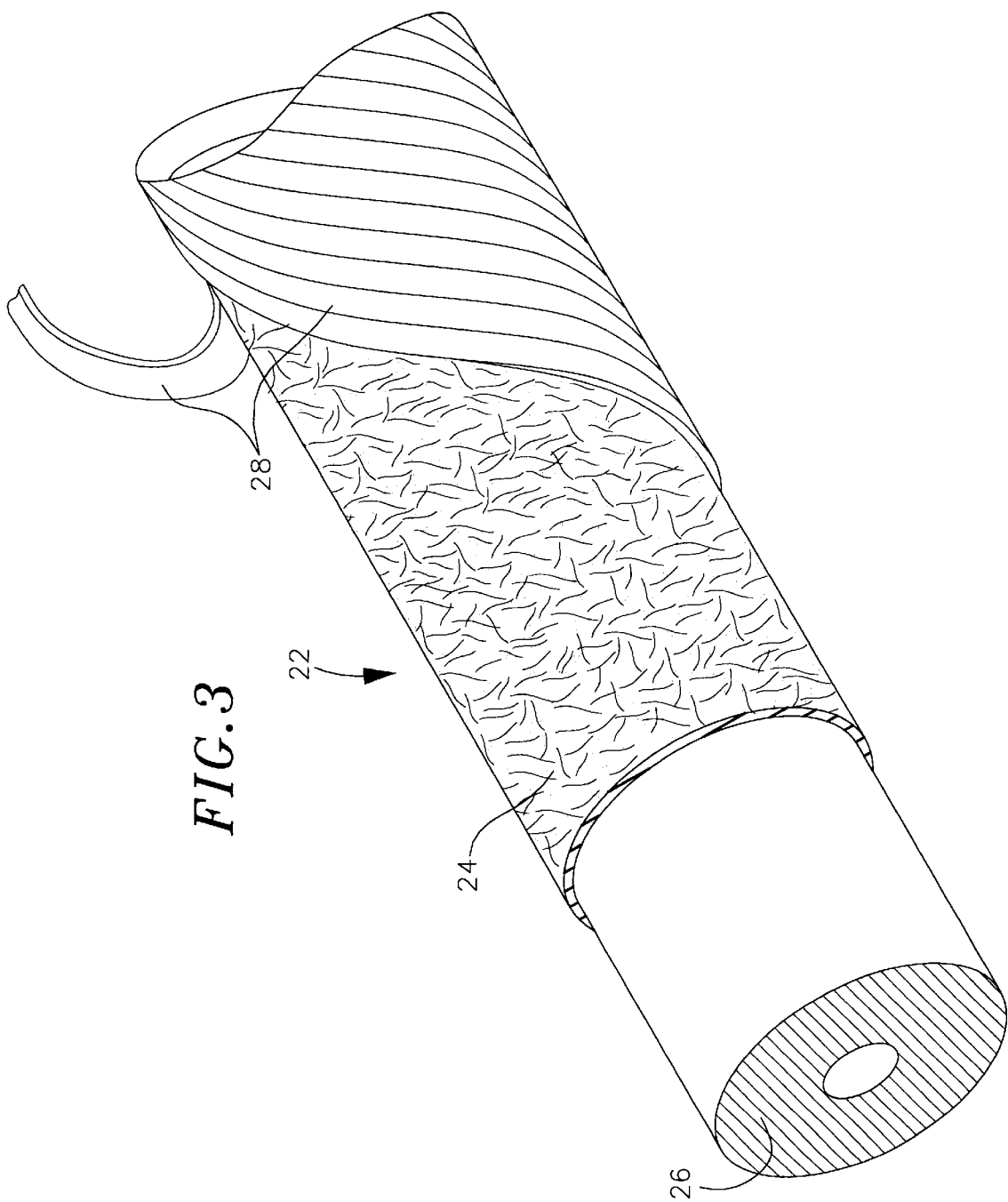
FIG. 3 is a perspective of a partially-completed abrasion resistant pipe of this invention, as shown in FIG. 1, illustrating a method of manufacturing the same.

FIG. 3 is a partially-formed abrasion resistant pipe 22 of FIG. 1 that shows the elastomeric abrasion resistant material layer 24 coated onto an underlying mandrel 26, and a portion of the fiberglass-reinforced resin pipe filament winding 28 disposed thereover. The method of making abrasion resistant pipes of this invention can be better understood by referring to the following example.

EXAMPLE

An abrasion resistant pipe was manufactured by applying a 0.5 millimeter coating of an aromatic polyurea elastomer material onto a 147 millimeter diameter mandrel that was first coated with a high-temperature wax mold release agent. The polymer elastomer was formed by using a 2-component Huntsman aromatic isocyanate quasi prepolymer and JEFFAMINE D-2000 system combined at an approximately 1:1 volume ratio. An fiberglass filament impregnated with Shell EPON-826 was wound over the polyurea coating to form an isophoronediamine (IPDA) cured fiberglass-reinforced resin having a filament thickness of approximately 4 millimeters. The filament winding process was initiated approximately 60 seconds after the polyurea elastomer material was applied, i.e., before the polyurea elastomer was fully cured to facilitate forming a chemical bond between the polyurea material and the epoxy resin. It is theorized that the bonds are formed by reaction between the amine groups present in the undercured polyurea material and the reactive epoxy groups in the epoxy resin. The resulting pipe was cured for about 45 minutes at 250° F., removed from the mandrel, and cut into sections for testing.

Test Results

The abrasion resistant pipe prepared in the example was tested for bond strength (between the liner and pipe wall). The pipe was exposed to cycled boiling water comprising eight hours of exposure to boiling water followed by 16 hours of ambient temperature water exposure. After 36 hours of boiling water exposure, the abrasion resistant liner showed no visible signs of blistering or disbanding to the epoxy laminate. When an attempt was made to peel the liner away from the underlying laminate, glass fibers from the laminate adhered to the peeled liner, indicating the formation of a strong bond between the polyurea liner and the epoxy laminate. The same test was conducted on a pipe section that was subjected to 100 hours of boiling water exposure with the same results.

The abrasion resistant liner of the example pipe was also tested for initial hardness and retained hardness after ambient water and boiling water exposure. Before boiling water exposure, the pipe liner was tested to have a durometer Shore A hardness of approximately 60. After immersing the pipe in water at 72° F. for approximately 336 hours, the pipe liner was tested to have a Shore A hardness of approximately 59, illustrating that ambient temperature water exposure had little if any effect on the hardness of the abrasion resistant liner. After immersing the pipe in boiling water for approximately 100 hours, the pipe liner was tested to have a Shore A hardness of approximately 58. illustrating that boiling water exposure had little if any effect on the hardness of the abrasion resistant liner.

Comparison Test Results

An abrasion resistant pipe of this invention was prepared in a manner similar to that discussed above in the example, except that a 50.8 millimeter (two-inch) diameter pipe was formed. Abrasion testing was conducted on this pipe and two other pipes; namely, a two-inch diameter conventional high density polyethylene (HDP) pipe, and a two-inch diameter fiberglass-reinforced epoxy resin pipe without an abrasion resistant liner, for comparison purposes. The pipes were cut into two inch long ring sections, weighed, and the thickness was measured. The ring section of each representative pipe was mounted rigidly and sandblasted axially against the ring section inside diameter for a period of approximately 10 minutes. After sandblasting, each ring section was reweighed and its thickness was remeasured.

With respect to weight loss, the abrasion resistant pipe of this invention displayed a maximum weight loss of approximately 0.4 percent, while the HDP pipe had a maximum weight loss of approximately 1 percent, and the conventional fiberglass-reinforced resin pipe had a maximum weight loss of approximately 7.4 percent. These results illustrate the superior abrasion resistance provided by the abrasion resistant pipe of this invention when compared to other conventional pipes. With respect to loss of wall thickness, the abrasion resistant pipe of this invention displayed a maximum loss of wall thickness of approximately 0.05 millimeters, while the HDP pipe had a maximum wall thickness loss of approximately 0.15 millimeters, and the conventional fiberglass-reinforced resin pipe had a maximum wall thickness loss of approximately 0.46 millimeters. These test results further illustrate the superior abrasion resistance provided by the abrasion resistant pipe of this invention when compared to other conventional pipes.

Abrasion resistant pipes of this invention have superior properties of toughness, and temperature, chemical, and abrasion resistance that are provided by the abrasion resistant elastomeric liner or coating. Additionally, pipes formed according to this invention also benefit from having a strong bond that is formed between the abrasion resistant elastomer material and the underlying composite substrate, e.g., fiberglass-reinforced resin pipe, thereby ensuring retention of the liner against the pipe wall to protect it from abrasive substances that are transported through the pipe. Another feature of this invention is its simplicity and speed of manufacture due to the relatively fast-curing nature of the abrasion resistant elastomer material and the related ability to wind quickly over the same to form the filament wound fiberglass-reinforced resin pipe. This feature allows the pipe to be formed during a single operation, rather than having to implement two separate operations, e.g., one to construct the liner, and a second one independent from the first to construct the pipe, or one to construct the pipe and a later one to apply a liner to the inside diameter of the finished pipe.

A still other feature of pipes formed according to this invention is improved impact resistance, when compared to conventional fiberglass-reinforced resin pipes, due to the presence of the elastomeric liner and/or outer coating. Additionally, the presence of the abrasion resistant elastomeric liner may have some effect on increasing the pressure rating of such pipe. It is theorized that this feature could be due to the ability of the elastomer material to flex and fill small gaps and cracks in the underlying pipe surface. This gap-filling ability can improve the pressure rating of a fiberglass-reinforced resin pipe for a given wall thickness.

Although the abrasion resistant pipes of this invention have been described and illustrated in the form of pipe having abrasion resistant liners or outer coatings, it is to be understood that the disclosed abrasion resistant coating of this invention can be used on any type or form of substrate that is formed from fiberglass-reinforced resin.

Although limited embodiments of abrasion resistant pipes and abrasion resistant coatings of this invention have been described and illustrated herein, many modifications and variations will be apparent to those skilled in the art. Accordingly, it is to be understood that within the scope of the appended claims, abrasion resistant pipes and abrasion resistant coatings of this invention may be embodied other than as specifically described herein.

What is claimed is:

1. A pipe comprising:
   a filament wound structural wall formed from a fiberglass-reinforced epoxy resin material; and
   an abrasion resistant liner disposed adjacent the structural wall, wherein the abrasion resistant liner is formed by using polyurea material that forms a chemical bond with the structural wall to provide a strong interface therebetween, wherein the materials used to form both the structural wall and the liner are placed into contact with one another before each is fully cured to form the chemical bond.

2. A pipe as recited in claim 1 wherein the polyurea material is formed by combining:
   an isocyanate ingredient; with
   an amine ingredient.

3. A pipe as recited in claim 2 wherein the polyurea material has the basic unit structure:

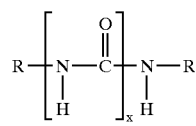

where x is greater than one, where R is selected from the group consisting of aromatic, aliphatic, or cycloaliphatic organic compound having up to about 20 carbon atoms, and where R' is a C=O containing compound comprising up to about 20 carbon atoms.

4. A pipe as recited in claim 2 wherein the amine ingredient is selected from the group consisting of primary amine terminated polyethers.

5. A pipe as recited in claim 1 wherein the abrasion resistant liner is disposed along an inside diameter of the structural pipe wall.

6. A pipe as recited in claim 1 wherein the abrasion resistant liner is disposed along an outside diameter of the structural pipe wall.

7. An abrasion resistant pipe comprising:
   a filament wound structural pipe wall formed from fiberglass-reinforced epoxy resin;

an abrasion resistant liner chemically bonded to an adjacent surface of the structural pipe wall, wherein the abrasion resistant liner is a polyurea elastomer formed by combining an isocyanate ingredient selected from the group of aliphatic isocyanates, cycloaliphatic isocyanates, and aromatic isocyanates with an amine ingredient, wherein the materials used to form the pipe wall and liner are at least partially uncured when placed in contact with one another.

8. A pipe as recited in claim 7 wherein the polyurea material has the general formula:

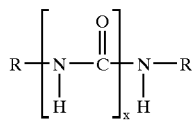

where x is greater than one, where R is selected from the group consisting of aliphatic, cycloaliphatic, anhydride, and aromatic organic compound having up to about 20 carbon atoms, and where R' is a C=O containing compound comprising up to about 20 carbon atoms.

9. A pipe as recited in claim 7 wherein the amine ingredient is selected from the group consisting of primary amine terminated polyethers.

10. A pipe as recited in claim 7 wherein the isocyanate ingredient is selected from the group consisting of aliphatic quasi prepolymers, aromatic quasi prepolymers, and mixtures thereof.

11. A pipe having an abrasion resistant inner liner comprising:
a structural pipe wall formed from a filament wound fiberglass-reinforced epoxy resin laminate;
an abrasion resistant liner disposed along an inside diameter of the structural pipe wall, the liner being formed from a polyurea elastomer having the general formula:

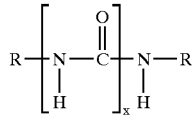

where x is greater than one, where R is selected from the groups consisting of aliphatic, cycloaliphatic, anhydride, and aromatic organic compound having up to about 20 carbon atoms, and where R' is a C=O containing compound comprising up to about 20 carbon atoms, wherein the polyurea elastomer is at least partially uncured when placed into contact with the structural pipe wall, wherein the liner is chemically bonded to an adjacent structural pipe inside diameter wall surface.

12. A method for making a pipe having an abrasion resistant inside diameter liner comprising:
coating a mandrel with a thermosetting elastomer material that is abrasion resistant when fully cured;
winding a resin thermosetting impregnated filament over the elastomer material to form a pipe wall structure, wherein the resin impregnated filament is wound over the elastomer material before the elastomer material is fully cured to form a chemical bond between the elastomer material and resin component of the pipe wall structure; and curing the elastomer material to form an abrasion resistant liner along an inside pipe diameter.

13. The method as recited in claim 12 wherein coating of the mandrel is done by spray application and the winding is initiated within less than sixty seconds of said spray application.

14. The method as recited in claim 12 wherein coating of the mandrel is done by spray application and the winding is initiated within less than 30 seconds of said spray application.

15. The method as recited in claim 12 wherein during coating, the elastomer material is one formed by combining an isocyanate-containing ingredient with an amine-containing resin ingredient.

16. The method as recited in claim 12 wherein during winding, the resin selected to impregnate the filament is an epoxy resin.

17. A method for making a pipe having an abrasion resistant inside liner comprising:
coating a mandrel with a polyurea elastomer that is abrasion resistant when fully cured;
winding an epoxy resin impregnated filament over the polyurea elastomer to form a pipe wall structure thereover, wherein the filament is wound over the polyurea elastomer within 60 seconds of coating to form a chemical bond between the polyurea elastomer and epoxy resin component of the pipe wall structure; and
curing the polyurea elastomer to form an abrasion resistant liner along an inside pipe diameter.

18. A method for making a pipe having an abrasion resistant outside diameter comprising:
winding a thermosetting resin impregnated filament over a mandrel to form a pipe wall structure; and
coating the pipe wall structure with at least a partially uncured polyurea elastomer before the resin impregnated filament is fully cured to form a chemical bond therebetween;
wherein the polyurea elastomer coating becomes fully cured before the resin impregnated filament to form a cured outside pipe diameter.

19. An abrasion resistant pipe comprising:
a filament wound structural pipe wall formed from fiberglass-reinforced epoxy resin;
an abrasion resistant liner bonded to an adjacent surface of the structural pipe wall, wherein the abrasion resistant liner is a polyurea elastomer formed by combining an isocyanate ingredient selected from the group of aliphatic isocyanates, cycloaliphatic isocyanates, and aromatic isocyanates with an amine ingredient, wherein the polyurea material has the general formula:

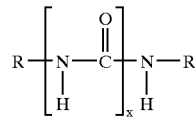

where x is greater than one, where R is selected from the group consisting of aliphatic, cycloaliphatic, anhydride, and aromatic organic compound having up to about 20 carbon atoms, and where R' is a C=O containing compound comprising up to about 20 carbon atoms.

* * * * *